(12) United States Patent
Carroll et al.

(10) Patent No.: US 6,170,519 B1
(45) Date of Patent: Jan. 9, 2001

(54) PRESSURE REGULATOR (75) Inventors: Kent Carroll, Bolingbrook; John R. Ripkey, McHenry, both of IL (US)

(73) Assignee: Hose Shop, Ltd., Algonquin, IL (US)

( * ) Notice: Under 35 U.S.C. 154(b), the term of this patent shall be extended for 0 days.

(21) Appl. No.: 09/362,475

(22) Filed: Jul. 28, 1999

(51) Int. Cl.$^7$ .................................................. G05D 16/10
(52) U.S. Cl. ..................................... 137/505.42; 137/505
(58) Field of Search ................................ 137/505.42, 505

(56) References Cited

U.S. PATENT DOCUMENTS

| | | |
|---|---|---|
| 2,615,287 | * 10/1952 | Senesky .................... 137/505.42 |
| 2,918,081 | 12/1959 | Lauer, Jr. . |
| 3,848,631 | 11/1974 | Fallon . |
| 3,890,999 | 6/1975 | Moskow . |
| 3,926,208 | 12/1975 | Hoffman et al. . |
| 4,064,890 | 12/1977 | Collins et al. . |
| 4,181,139 | 1/1980 | Martini . |
| 4,194,522 | 3/1980 | Lucas et al. . |
| 4,226,257 | 10/1980 | Trinkwalder . |
| 4,450,858 | 5/1984 | Acomb . |
| 5,086,807 | 2/1992 | Lasnier et al. . |
| 5,123,442 | * 6/1992 | Geuy et al. .................... 137/495 |
| 5,234,026 | 8/1993 | Patterson . |
| 5,280,778 | 1/1994 | Kotsiopoulos . |
| 5,368,022 | 11/1994 | Wagner . |
| 5,392,825 | 2/1995 | Mims et al. . |
| 5,411,053 | 5/1995 | Markham et al. . |
| 5,522,421 | 6/1996 | Holt et al. . |

* cited by examiner

Primary Examiner—Stephen M. Hepperle
(74) Attorney, Agent, or Firm—Welsh & Katz, Ltd.

(57) ABSTRACT

A pressure regulator for controlling the delivery of gas from a high pressure source to a low pressure device. The pressure regulator includes a distribution body and a pressure adjusting mechanism. The distribution body has a high pressure region and a low pressure region formed therein. The pressure adjusting mechanism controls the transfer of gas from the high pressure region to the low pressure region. The pressure adjusting mechanism includes a piston, an adjusting slug, a seat retainer, a regulator seat, a regulator pin, and a resilient spring.

23 Claims, 6 Drawing Sheets

PRESSURE REGULATOR

FIELD OF THE INVENTION

The present invention relates generally to a pressure regulator and fill station. More particularly, the present invention relates to a pressure regulator and fill station for use in sporting events where projectiles, such as paint balls, are propelled using compressed gases.

BACKGROUND OF THE INVENTION

Sporting events have been developed to simulate the strategies that are typically experienced with actual military confrontations. These sporting events require the participants to either work alone or as a group with the goal to locate and capture other participants.

Once an opposing participant is located, the participant fires projectiles at the opposing participant. The object of the game is to be the last person who has not been hit with a projectile.

Since it is desirable to not injure the opposing participant with the projectiles when the opposing participant is struck with the projectile, it is common to use liquid-filled projectiles that burst when striking the participant. Typically the projectiles are filled with a colored liquid, such as paint, which at least partially covers the participant when the projectile strikes the participant. The colored paint thereby indicates to other participants which participants have been hit and, therefore, are out of the game.

The projectiles used in these games are typically propelled with a compressed gas to avoid the potential dangers of using explosives, such as gun powder, that are typically used with bullets in conventional guns. Additionally, the compressed gas costs less than explosives.

When these types of systems are used, a high pressure source of gas is provided as a source of the compressed gas used in the guns. While a high gas pressure is needed to propel the paint balls, this pressure is typically considerably less than the pressure in the high pressure source of gas. As such, it is necessary to regulate the pressure of the compressed gas provided to the gun to prevent damaging the gun.

Acomb, U.S. Pat. No. 4,450,858, discloses a dual-spring, adjustable pressure reducing valve. The Acomb valve includes a piston that slides within a bore of the valve body. The piston includes a sealing portion that is urged against the valve seat by a first spring. A second spring provides a force against a diaphragm for adjusting the pressure reducing finction. The force of the spring against the diaphragm is adjusted by a first adjusting screw, and a support plate that directly contacts the spring to force the spring against the diaphragm. The Acomb device directs high pressure gas through the piston and outwardly into the high-pressure chamber through openings in the piston. Adjustment of the Acomb device is provided by a direct force applied to the main spring of the regulator.

SUMMARY OF THE INVENTION

The present invention is a pressure regulator for controlling the delivery of a gas from a high pressure source to a low pressure device. The pressure regulator includes a distribution body and a pressure adjusting mechanism.

The distribution body has a high pressure region and a low pressure region. The pressure adjusting mechanism controls the transfer of gas from the high pressure region to the low pressure region. The pressure adjusting mechanism includes a piston, belleville springs, a retaining mechanism, an adjusting slug, a set screw, a regulator seat, regulator pin, and a resilient spring.

The piston has an aperture formed therein. The belleville springs extend over a portion of the piston. The piston and the belleville springs at least partially seat in the bonnet aperture. The retaining mechanism engages the belleville springs and removably retains the pressure adjusting mechanism with respect to the distribution body. The adjusting slug at least partially extends through the aperture in the piston. The set screw is mounted for movement with respect to the piston for changing a position of the adjusting slug with respect to the piston. The regulator seat has an aperture formed therein. The regulator pin engages the adjusting slug. The resilient spring biases the regulator pin towards the regulator seat such that the regulator pin substantially seals the aperture in the regulator seat.

DETAILED DESCRIPTION OF THE INVENTION

While the present invention is susceptible of embodiments in various forms, there is shown in the drawings and will hereinafter be described presently preferred embodiments with the understanding that the present disclosure is to be considered an exemplification of the invention and is not intended to limit the invention to the specific embodiments illustrated.

Figures 1, 2, 4:
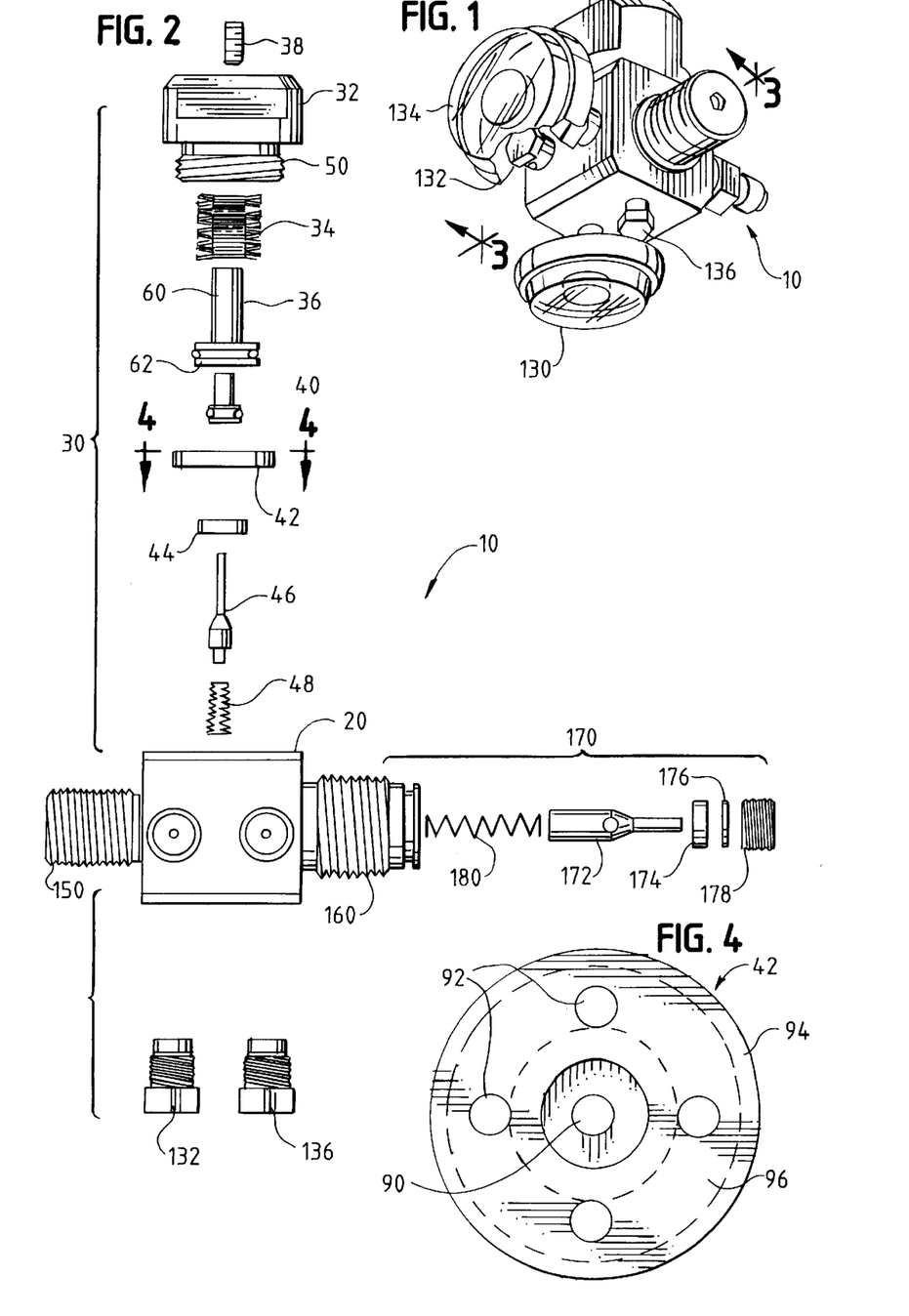
FIG. 1 is a perspective view of a pressure regulator according to the present invention.
FIG. 2 is an exploded side view of the pressure regulator.
FIG. 4 is a top view of a seat retainer taken along a line 4—4 in FIG. 2.

The present invention includes a pressure regulator, as most clearly illustrated at 10 in FIGS. 1 and 2. The pressure regulator 10 permits gas to be transferred from a high pressure source to a low pressure device. The pressure regulator is adjustable so that the pressure of gas supplied to the low pressure device is variable. A person of ordinary skill in the art will appreciate that it is possible to utilize the concepts of the present invention in conjunction with the transfer of liquids from a high pressure source to a low pressure device.

Figure 3:
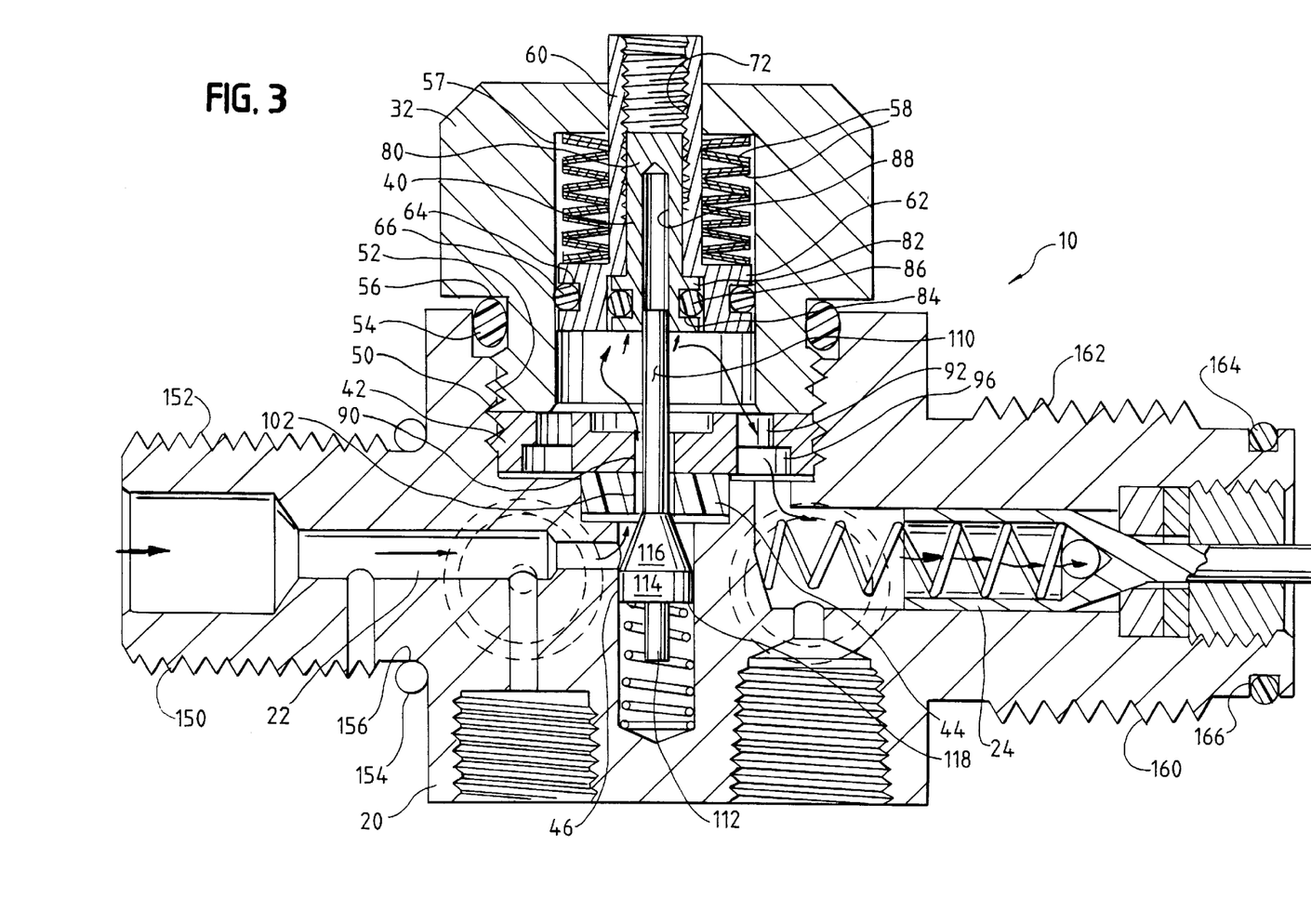
FIG. 3 is a sectional view of the pressure regulator taken along a line 3—3 in FIG. 1.
Figure 5:
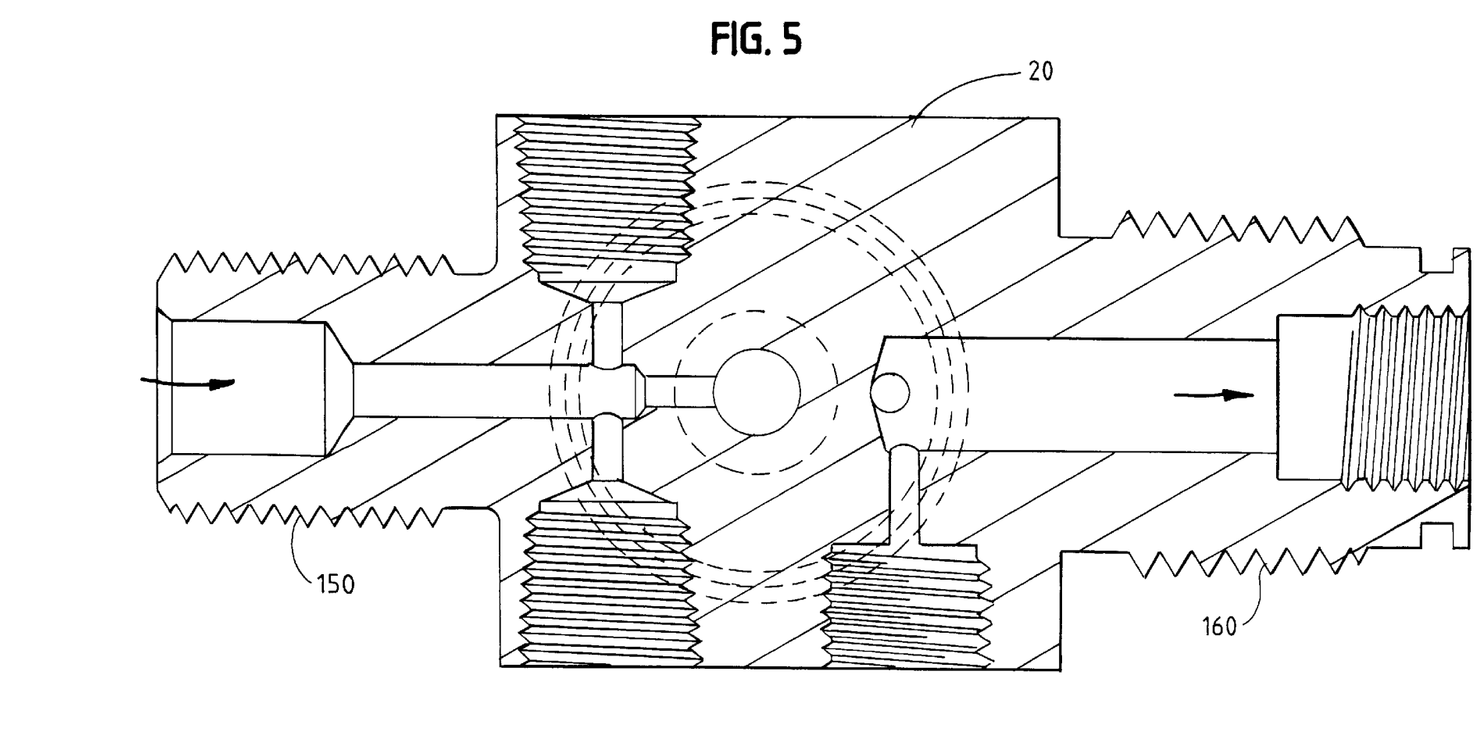
FIG. 5 is a sectional view of the pressure regulator taken along a line 5—5 in FIG. 4 with the internal components removed for clarity of illustration.

The pressure regulator 10 includes a distribution body 20 having a high pressure region 22 and a low pressure region 24 that are in communication through a pressure adjustment mechanism 30, as most clearly illustrated in FIGS. 3 and 5. The distribution body 20 is preferably machined from an aluminum block. However, a person of ordinary skill in the art will appreciate that it is possible to fabricate the distribution body 20 from other materials using the concepts of the present invention.

The pressure adjusting mechanism 30 includes a bonnet 32, belleville springs 34, a piston 36, a set screw 38, an adjusting slug 40, a seat retainer 42, a regulator seat 44, a regulator pin 46, and a resilient spring 48, as most clearly illustrated in FIGS. 2 and 3.

The bonnet 32 includes a threaded region 50 on an outer surface thereof for removably attaching the bonnet 32 to a complementary threaded region 52 formed in the distribution body 20. The bonnet 32 also preferably includes an O-ring 54 retained in a channel 56. The O-ring 54 enhances the seal formed between the bonnet 32 and the distribution body 20.

The bonnet 32 has an axial recess 57 formed therein. The axial recess 57 extends nearly the entire length of the bonnet 32. The axial recess 57 is adapted to receive the belleville springs 34 and the piston 36. The belleville springs 34 include a plurality of spring elements 58 that are positioned over a shaft portion 60 of the piston 36. An outer diameter of the spring elements 58 is approximately the same as a diameter of the axial recess 57. An inner diameter of the spring elements 58 is approximately the same as a diameter of the shaft portion 60.

The piston 36 further includes a base portion 62 that has a diameter that is approximately the same as the diameter of the axial recess 56. The base portion 62 includes a channel 64 formed therein that is adapted to receive an O-ring 66. The O-ring forms a seal between the piston 36 and the bonnet 32.

The piston 36 further includes an inner bore 70 that extends through the shaft portion 60 and the base portion 62. A section of the inner bore 70 that extends through the shaft portion 60 has a smaller diameter than a section of the inner bore 70 that extends through the base portion 62. At least a portion of the inner bore 70 that extends through the shaft portion 60 includes a threaded region 72.

The set screw 38 includes a threaded region 74 on an outer surface thereof. The threaded region 74 on the set screw 38 engages the threaded region 72 in the inner bore 70 for operably attaching the set screw 38 to the piston 36.

The adjusting slug 40 includes a shaft portion 80 and a base portion 82. The shaft portion 80 has a diameter that is smaller than the diameter of the inner bore 70 so that the adjusting slug can at least partially extend into the piston 36. The position of the adjusting slug 40 in the piston 36 is controlled by the set screw 38. The base portion 82 includes a channel 84 formed therein that is adapted to receive an O-ring 86. The O-ring forms a seal with the inner bore 72 proximate the base portion 62 of the piston 36. The adjusting slug 40 includes an axial bore 88 that partially extends therethrough. The axial bore 88 is adapted to receive the regulator pin 46.

The seat retainer 42 has a substantially circular shape. The seat retainer 42 has an axial bore 90 formed therethrough. The regulator pin 46 extends through the axial bore 90. The seat retainer 42 also preferably has at least one peripheral recess 92 that extends around the axial bore 90 formed in a first surface 94 thereof. The recess 92 is adapted to partially receive the base portion 82 of the adjusting slug 40.

The seat retainer 42 also preferably includes a circular channel 96 formed into a second surface 98, which is opposite the first surface 94, as most clearly illustrated in FIGS. 3 and 4. At approximately equally spaced positions on the seat retainer 42, bores 100 are formed in the seat retainer 42. The bores 100 are located in the circular channel 96 and extend through the seat retainer 42.

The regulator seat 44 has a substantially circular shape with a circular bore 102 formed therethrough. The regulator pin 46 extends through the circular bore 102. The regulator seat 44 is formed from a resilient material that forms a seal with the seat retainer 42 and the regulator pin 46.

The regulator pin 46 includes a first shaft portion 110, a second shaft portion 112, and a main portion 114. The regulator pin 46 includes a frustro-conical surface 116 where the first shaft portion 110 intersects the main portion 114. The regulator pin 46 intersects the regulator seat 44 at the frustro-conical surface 116. The regulator pin 46 includes a lip 118 where the second shaft portion 112 intersects the main portion 114. The spring 48 engages the regulator pin 46 proximate the lip 118.

The spring 48 biases the regulator pin 46 against the regulator seat 44, which urges the regulator seat 44 against the seat retainer 42. Gas is thereby prevented from passing through the pressure adjusting mechanism 30.

The high pressure region of the pressure regulator 10 preferably includes a pressure gauge 130 to monitor the pressure of the gas in the high pressure region 22. The high pressure region 22 also preferably includes a high pressure burst disk 132 that is selected with a desired pressure rating to prevent damage to the pressure regulator or other connected components caused by excessive pressure from a high pressure gas source (not shown). The pressure gauge 130 and the high pressure burst disk 132 are both removably attached to the distribution body 20 using threaded surfaces.

The low pressure region 24 of the pressure regulator 10 preferably includes a pressure gauge 134 to monitor the pressure of the gas in the low pressure region 24. The low pressure region 24 also preferably includes a low pressure burst disk 136 that is selected with a desired pressure rating to prevent damage to the pressure regulator or other connected components caused by excessive pressure that is transmitted from the high pressure region. The pressure gauge 134 and the low pressure burst disk 136 are both removably attached to the distribution body 20 using threaded surfaces.

Extending from the first end 22 is a first connector 150 for attaching the pressure regulator 10 to the high pressure gas source (not shown). The first connector 150 preferably includes a threaded region 152 on an outer surface thereof. To further ensure that a gas impervious seal is formed between the high pressure gas source and the first connector 150, the pressure regulator 10 includes a resilient O-ring 154 that seats in a channel 156 formed in an outer surface of the first connector 150 proximate the distribution body 20.

Extending from the second end 24 is a second connector 160 for attaching the pressure regulator 10 to a low pressure device (not shown). The second connector 160 preferably includes a threaded region 162 on an outer surface thereof. To further ensure that a gas impervious seal is formed between the low pressure device and the second connector 160, the pressure regulator 10 includes a resilient O-ring 164 that seats in a channel 166 formed in the second connector 160 opposite the distribution body 20.

The second connector 160 further includes a valve mechanism 170 that only permits to gas to pass through the second connector 160 when the low pressure device (not shown) is attached to the second connector 160. The valve mechanism 170 includes a pin valve 172, a seat 174, a thrust washer 176, a locking mechanism 178, and a resilient spring 180.

The seat 174 has an aperture 182 extending therethrough. The pin valve 172 includes a frustro-conical surface 184. The resilient spring 180 biases the pin valve 172 towards the seat 174 so that the frustro-conical surface 184 engages the seat 174 proximate the aperture 182 and thereby seals the aperture. The thrust washer 176 includes an aperture through which the pin valve 172 extends. The thrust washer 176 is positioned between the seat 174 and the locking mechanism 178. The locking mechanism 178 has a threaded outer surface 186 for removably attaching the valve mechanism 170 with respect to the second connector 160.

When the low pressure device (not shown) is attached to the second connector 160, a boss (not shown) in the low pressure device urges the pin valve 172 away from the seat 174 and thereby allows gas to pass through the valve mechanism 170.

As gas pressure inside the low pressure region 24 increases, the gas pressure urges the piston 36 upwardly towards the belleville springs 34. This movement causes the regulator pin 46 to seat against the regulator seat 44 and thereby stop gas from passing through the pressure adjustment mechanism 30.

As gas pressure inside the low pressure region 24 decreases, the belleville springs 34 urge the piston 36 downwardly. This movement causes the regulator pin 46 to move away from the regulator seat 44 and thereby permit gas to pass through the pressure adjustment mechanism 30.

The regulator pin 46 moves upward and downward to close and open the flow of gas by movement of the piston 36 and the adjusting slug 40 on which the springs apply a force. The regulator seat 44 and the seat retainer 42 remain in a relatively fixed position in the pressure regulator 10.

The pressure regulator 10 is adjusted by movement of the adjusting slug 40 relative to the piston 36. Downward movement of the set screw 38 causes the adjusting slug 40 to move downwardly against the regulator pin 46. In this manner, the movement of the regulator pin 46 relative to the piston 36 can be adjusted while maintaining the piston 36 in a relatively fixed position, merely by moving the adjusting slug 40 relative to the piston.

Figure 6:
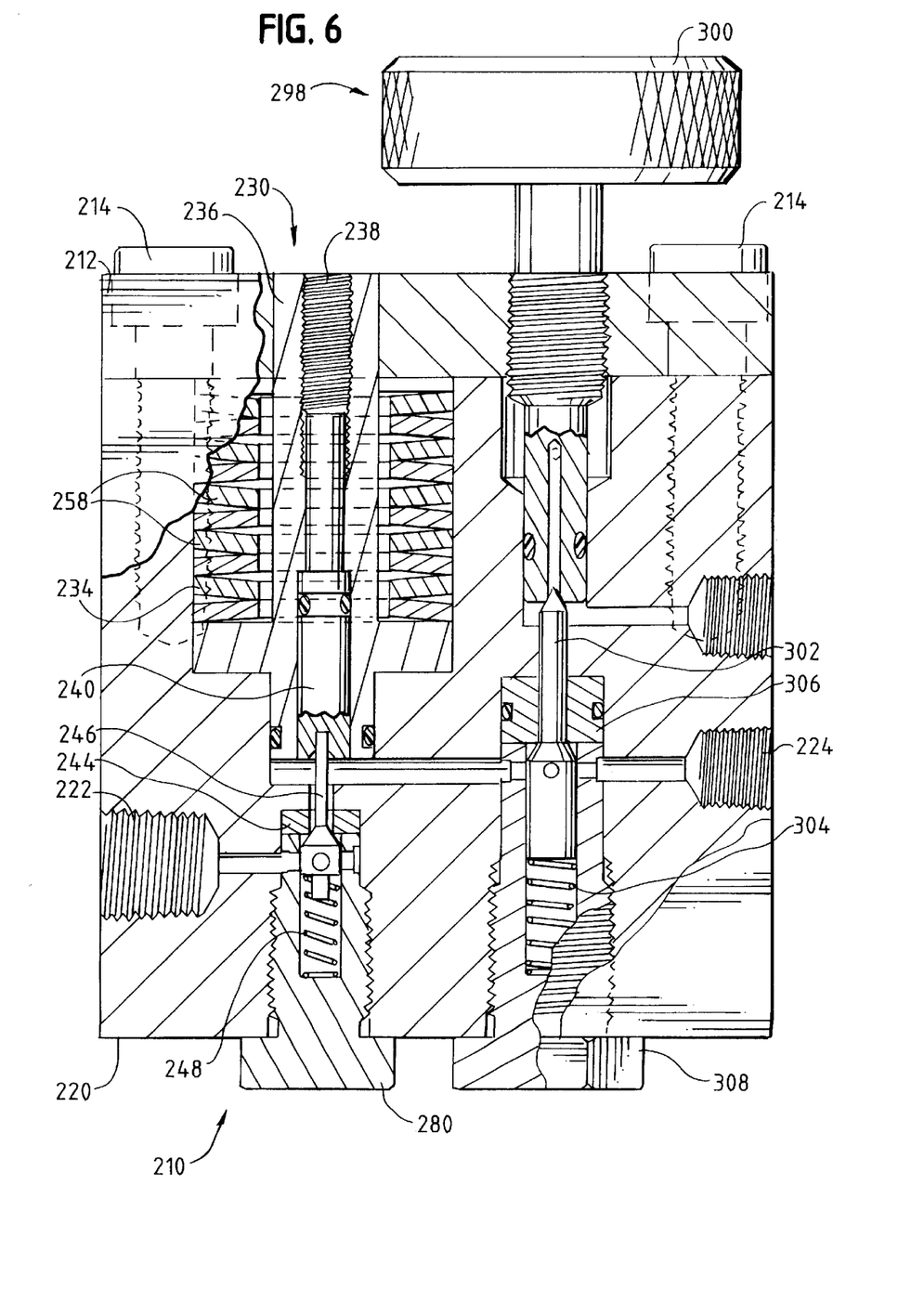
FIG. 6 is a sectional view of a fill station embodying the principles of the present invention.
Figure 7:
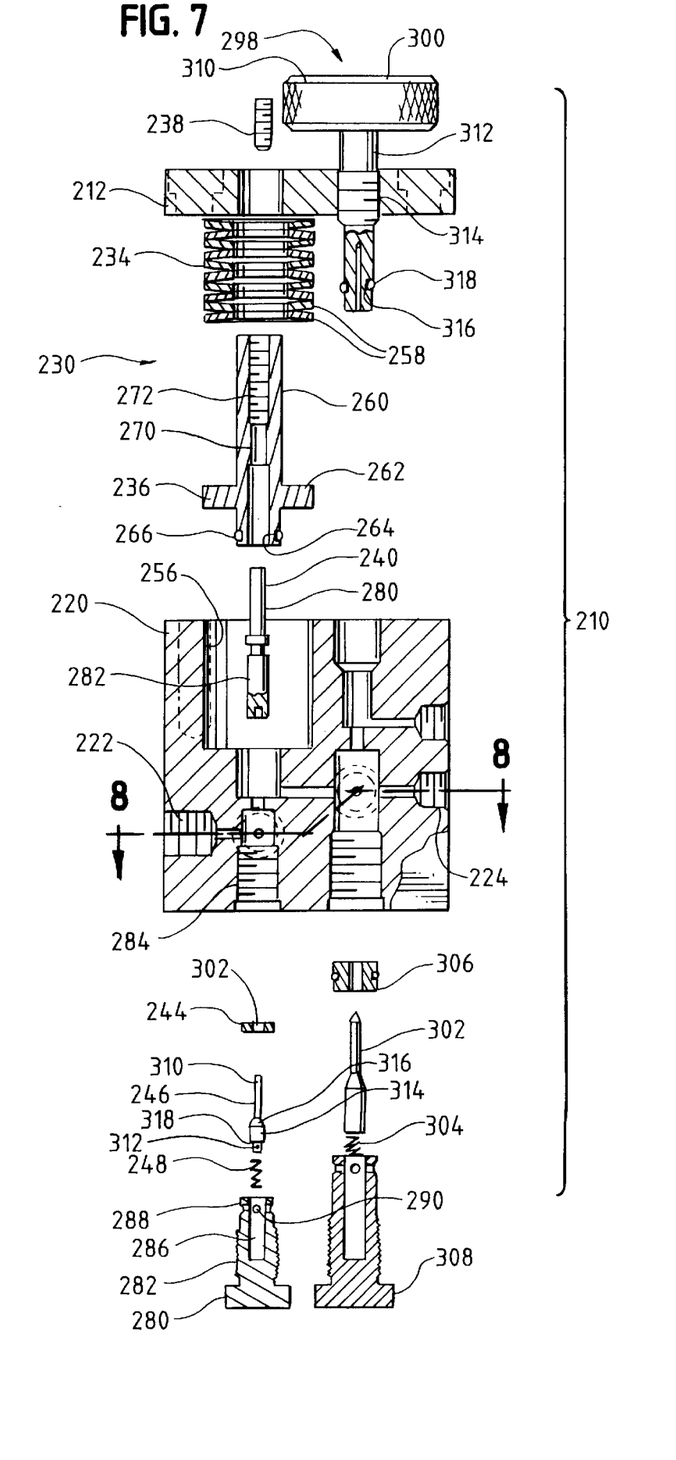
FIG. 7 is an exploded section view of the fill station.

The present invention also includes a fill station, as most clearly illustrated at 210 in FIGS. 6 and 7. The fill station 210 permits gas to be transferred from a high pressure storage container (not shown) to a lower pressure storage container (not shown). The fill station 210 is adjustable so that the pressure of gas in the lower pressure storage container is variable.

Figure 8:
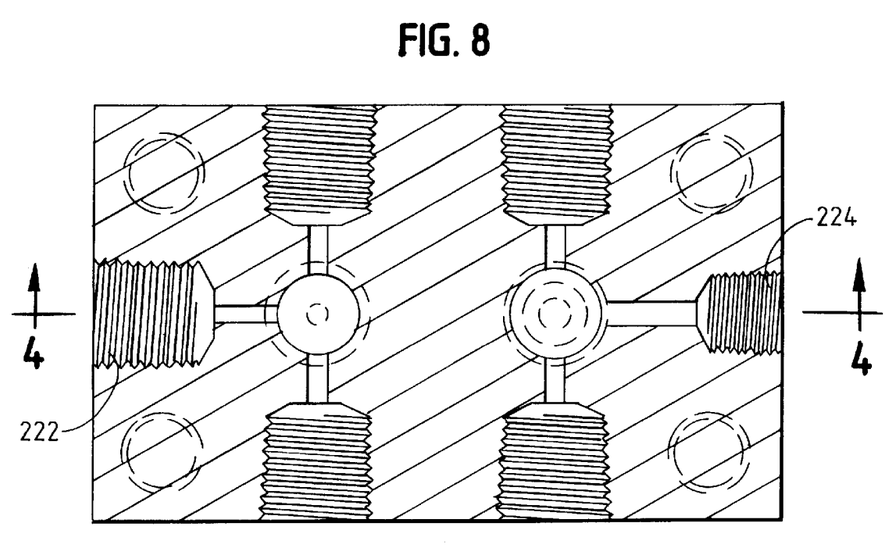
FIG. 8 is a sectional view of the fill station taken along a line 8—8 in FIG. 7 with the internal components removed for clarity of illustration.

The fill station 210 includes a distribution body 220 having a high pressure region 222 and a low pressure region 224 that are in communication through a pressure adjusting mechanism 230, as most clearly illustrated in FIGS. 6–8. The fill station 210 also includes a top cover 212 that is removably attached to the distribution body 220 using a plurality of bolts 214. The cover 212 preferably includes recesses where each of the bolts 214 extend through the cover 212 so as to recess heads of the bolts 214 into the cover 212.

The pressure adjusting mechanism 230 includes belleville springs 234, a piston 236, a set screw 238, an adjusting slug 240, a regulator seat 244, a regulator pin 246, and a resilient spring 248, as most clearly illustrated in FIGS. 6 and 7.

The distribution body 220 includes a circular recess 256 that is adapted to receive the belleville springs 234 and the piston 236. The belleville springs 234 include a plurality of spring elements 258 that are positioned over a shaft portion 260 of the piston 236. An outer diameter of the spring elements 258 is approximately the same as a diameter of the recess 256. An inner diameter of the spring elements 258 is approximately the same as the diameter of the shaft portion 260.

The piston 236 further includes a base portion 262 that has a diameter that is approximately the same as that of the recess 256. The base portion 262 includes a channel 264 formed therein that is adapted to receive an O-ring 266. The O-ring 266 forms a seal between the piston and the distribution body 220.

The piston 236 further includes an inner bore 270 that extends through the shaft portion 260 and the base portion 262. A section of the inner bore 270 that extends through the shaft portion 260 has a smaller diameter than a section of the inner portion 270 that extends through the base portion 262. At least a portion of the inner bore 270 that extends through the shaft portion 260 includes a threaded region 272.

The set screw 238 includes a threaded region 274 on an outer surface thereof. The threaded region 274 on the set screw 238 engages the threaded region 272 in the inner bore 270 for operably attaching the set screw 238 to the piston 236.

The adjusting slug 240 includes a shaft portion 322 and a base portion 282. The shaft portion 322 has a diameter that is smaller than the diameter of the inner bore 270 so that the adjusting slug 240 can at least partially extend into the piston 236. The position of the adjusting slug 240 in the piston 236 is controlled by the set screw 238. The base portion 282 includes a channel 284 formed therein that is adapted to receive an O-ring 286. The O-ring 286 forms a seal with the inner bore 272 proximate the base portion 262 of the piston 236. The adjusting slug 240 includes an axial bore 288 that partially extends therethrough. The axial bore 288 is adapted to receive the regulator pin 246.

The regulator seat 244 has a substantially circular shape with a circular bore 302 formed therethrough. The regulator pin 246 extends through the circular bore 302. The regulator seat 244 is formed from a resilient material that forms a seal with the distributor body 220 and the regulator pin 246.

The regulator pin 246 includes a first shaft portion 310, a second shaft portion 312, and a main portion 314. The regulator pin 246 includes a frustro-conical surface 316 where the first shaft portion 310 intersects the main portion 314. The regulator pin 246 includes a lip 318 where the second shaft intersects the main portion 314. The spring 248 engages the regulator pin 246 proximate the lip 318.

The regulator seat retainer 322 removably retains the regulator pin 246 within the distributor body 220. The regulator seat retainer 322 includes a threaded region 324 on an outer surface thereof. The threaded region 324 engages a complementary threaded region 326 on the distribution body 220.

Opposite the threaded region 324, the regulator seat retainer 322 has an axial bore 328 formed therein. The axial bore 328 is adapted to receive the spring 248 and the regulator pin 246. The regulator seat retainer 322 further includes a channel 330 formed in an outer surface thereof. At several spaced-apart positions in the channel 330, the regulator seat retainer 322 has apertures 290 formed therein. The apertures 290 extend through the wall of the regulator seat retainer 322.

The low pressure region 224 includes a valve mechanism 298 that controls the transfer of the gas to the low pressure device (not shown). The valve mechanism 298 includes a control knob 300, a valve pin 322, a spring 304 and a valve seat 306, and a valve seat retainer 308. The control knob 300 has a handle portion 334 and a shaft portion 336 extending therefrom. The handle portion 334 is used for controlling the movement of the control knob 300. At an intermediate location on the shaft portion 336 there is a threaded region 338. The control knob 300 removably engages the top plate through the threaded region 338.

Opposite the handle portion 334, a channel 340 is formed in the shaft portion 336. The channel 340 is adapted to receive an O-ring 342. The O-ring 342 forms a seal between the shaft portion 336 and the distribution body 220.

The high pressure region of the fill station 210 preferably includes a pressure gauge (not shown) to monitor the pressure of the gas in the high pressure region 222. The pressure gauge is preferably removably attached to the distribution body 220 using threaded surfaces.

The low pressure region 224 of the fill station 210 preferably includes a pressure gauge (not shown) to monitor the pressure of the gas in the low pressure region 224. The pressure gauge is removably attached to the distribution body 220 using threaded surfaces.

As gas pressure inside the low pressure region 224 increases, the gas pressure urges the piston 236 upwardly towards the belleville springs 234. This movement causes the regulator pin 246 to seat against the regulator seat 244 and thereby stop gas from passing through the pressure adjustment mechanism 230.

As gas pressure inside the low pressure region 224 decreases, the belleville springs 234 urge the piston 236 downwardly. This movement causes the regulator pin 246 to move away from the regulator seat 244 and thereby permit gas to pass through the pressure adjustment mechanism 230.

The regulator pin 246 moves upward and downward to close and open the flow of gas by movement of the piston 236 and the adjusting slug 240 on which the springs apply a force. The regulator seat 244 and the seat retainer 242 remain in a relatively fixed position in the pressure regulator 210.

The pressure regulator is adjusted by movement of the adjusting slug 240 relative to the piston 236. Downward movement of the set screw 238 causes the adjusting slug 240 to move downwardly against the regulator pin 246. In this manner, the movement of the regulator pin 246 relative to the piston 236 can be adjusted while maintaining the piston 236 in a relatively fixed position, merely by moving the adjusting slug 240 relative to the piston.

The valve mechanism 298 is activated by rotating the control knob 300 with respect to the distribution body 220. This movement urges the pin valve 332 away from the valve seat 306 to thereby allow gas to pass through the valve mechanism 298.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A pressure regulator for controlling the delivery of gas from a high pressure source to a low pressure device, the pressure regulator comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston;

a retaining mechanism engages the belleville springs and removably retains the pressure adjusting mechanism with respect to the distribution body, the retaining mechanism being a bonnet that removably engages the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug;

a resilient spring biasing the regulator pin towards the regulator seat such that the regulator pin substantially seals the aperture in the regulator seat; and a seat retainer having a central aperture and at least one periphery aperture, wherein the regulator pin extends through the central aperture and wherein the regulator seat seals against the seat retainer.

2. A pressure regulator for controlling the delivery of a gas from a high pressure source to a low pressure device, the pressure regulator comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston:

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug; and a resilient spring biasing the regulator pin towards the regulator seat such that the regulator pin substantially seals the aperture in the regulator seat, wherein the retaining mechanism includes a cover that is removably retained with respect to the distribution body with a plurality of mounting screws.

3. The pressure regulator of claim 1, wherein the high pressure region further includes a connector for removably attaching the pressure regulator to a high pressure gas source.

4. The pressure regulator of claim 1, wherein the high pressure region further includes a connector for removably attaching the pressure regulator to a low pressure device.

5. The pressure regulator of claim 4, wherein the connector comprises a valve mechanism that seals the low pressure region opposite the pressure regulating mechanism.

6. The pressure regulator of claim 5, wherein the valve mechanism comprises:

a pin valve;

a seat having an aperture therethrough, wherein the seat is removably retained with respect to the distribution body; and a resilient spring that biases the pin valve against the seat to seal the seat aperture.

7. The pressure regulator of claim 5, wherein the valve mechanism comprises:

a pin valve;

a valve seat having an aperture extending therethrough, wherein the valve seat is removably mounted with respect to the distribution body;

a resilient spring biasing the pin valve towards the valve seat so that the pin valve substantially seals the valve seat aperture; and a control knob removably mounted to the distribution body for changing the position of the pin valve with respect to the valve seat.

8. A pressure regulator for controlling the delivery of a gas from a high pressure source to a low pressure device, the pressure regulator comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston;

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug; and a resilient spring biasing the regulator pin towards the regulator seat such that the regulator pin substantially seals the aperture in the regulator seat, wherein the high pressure region further includes a pressure gauge and a high pressure burst disk.

9. A pressure regulator for controlling the delivery of a gas from a high pressure source to a low pressure device, the pressure regulator comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston;

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug; and a resilient spring biasing the regulator pin towards the regulator seat such that the regulator pin substantially seals the aperture in the regulator seat, wherein the low pressure region further includes a pressure gauge and a low pressure burst disk.

10. A pressure regulator for controlling the delivery of gas from a high pressure source to a low pressure device, the pressure regulator comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a bonnet having an aperture formed therein, wherein the bonnet removably engages the distribution body;

a piston having an aperture formed therein;

belleville springs extending over a portion of the piston;

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug;

a seat retainer having a central aperture and at least one periphery aperture, wherein the regulator pin extends through the central aperture and wherein the regulator seat seals against the seat retainer; and a resilient spring biasing the regulator pin towards the regulator seat such that the regulator pin substantially seals the aperture in the regulator seat.

11. The pressure regulator of claim 10, and further comprising a valve mechanism that seals the low pressure region opposite the pressure regulating mechanism.

12. The pressure regulator of claim 10, wherein the high pressure region further includes a pressure gauge and a high pressure burst disk.

13. The pressure regulator of claim 10, wherein the low pressure region further includes a pressure gauge and a low pressure burst disk.

14. A fill station for controlling the delivery of a gas from a high pressure source to a low pressure device, the fill station comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston;

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug;

a resilient spring biasing the regulator pin towards the regulator seat such that the regulator pin substantially seals the aperture in the regulator seat;

a cover plate; and a plurality of mounting screws removably retaining the cover with respect to the distribution body for removably mounting the pressure adjusting mechanism to the distribution body.

15. A fill station for controlling the delivery of a gas from a high pressure source to a low pressure device, the fill station comprising:

a distribution body having a high pressure region and a low pressure region formed therein; and a pressure adjusting mechanism engaging the distribution body for controlling the transfer of gas from the high pressure region to the low pressure region, wherein the pressure adjusting mechanism comprises:

a piston having an aperture formed therein;

belleville springs extending over a portion of the piston;

a retaining mechanism engages the belleville springs and removably retains the pressure adjusting mechanism with respect to the distribution body;

an adjusting slug at least partially extending through the aperture in the piston;

a set screw mounted for movement with respect to the piston for changing a position of the adjusting slug with respect to the piston;

a regulator seat having an aperture formed therein;

a regulator pin engaging the adjusting slug;

a resilient spring biasing the regulator pin towards the regulator seat such that the regulator pin substantially seals the aperture in the regulator seat; and a valve mechanism that seals the low pressure region opposite the pressure regulating mechanism.

16. The fill station of claim 15, wherein the valve mechanism comprises:

a pin valve;

a valve seat having an aperture extending therethrough, wherein the valve seat is removably mounted with respect to the distribution body;

a resilient spring biasing the pin valve towards the valve seat so that the pin valve substantially seals the valve seat aperture; and a control knob removably mounted to the distribution body for changing the position of the pin valve with respect to the valve seat.

17. The fill station of claim 14, wherein the high pressure region further includes a pressure gauge and wherein the low pressure region further includes a pressure gauge.

18. The fill station of claim 15, wherein the high pressure region further includes a pressure gauge and wherein the low pressure region further includes a pressure gauge.

19. The pressure regulator of claim 2, wherein the high pressure region further includes a connector for removably attaching the pressure regulator to a high pressure gas source.

20. The pressure regulator of claim 2, wherein the high pressure region further includes a connector for removably attaching the pressure regulator to a low pressure device.

21. The pressure regulator of claim 20, wherein the connector comprises a valve mechanism that seals the low pressure region opposite the pressure regulating mechanism.

22. The pressure regulator of claim 21, wherein the valve mechanism comprises:

a pin valve;

a seat having an aperture therethrough, wherein the seat is removably retained with respect to the distribution body; and a resilient spring that biases the pin valve against the seat to seal the seat aperture.

23. The pressure regulator of claim 21, wherein the valve mechanism comprises:

a pin valve;

a valve seat having an aperture extending therethrough, wherein the valve seat is removably mounted with respect to the distribution body;

a resilient spring biasing the pin valve towards the valve seat so that the pin valve substantially seals the valve seat aperture; and a control knob removably mounted to the distribution body for changing the position of the pin valve with respect to the valve seat.

* * * * *